Feb. 10, 1970          E. C. LUCKENBACH          3,494,858
            TWO-STAGE COUNTERCURRENT CATALYST REGENERATOR
Filed Nov. 17, 1967                          2 Sheets-Sheet 1

E. C. Luckenbach INVENTOR

BY

ATTORNEY

Feb. 10, 1970 E. C. LUCKENBACH 3,494,858
TWO-STAGE COUNTERCURRENT CATALYST REGENERATOR
Filed Nov. 17, 1967 2 Sheets-Sheet 2

United States Patent Office 3,494,858
Patented Feb. 10, 1970

3,494,858
TWO-STAGE COUNTERCURRENT CATALYST REGENERATOR
Edward C. Luckenbach, Mountainside, N.J., assignor to Esso Research and Engineering Company, a corporation of Delaware
Filed Nov. 17, 1967, Ser. No. 684,010
Int. Cl. B01j 9/04; C10g 11/04
U.S. Cl. 208—164                                4 Claims

ABSTRACT OF THE DISCLOSURE

Spent catalyst from a conversion zone is regenerated in a fluidized bed followed by a transfer-line regeneration zone with or without a final regeneration in a bed of fluidized catalyst placed in the regenerator below the first fluidized bed.

Background

This invention relates to the handling of finely divided solids in the fluidized state, and more particularly to systems wherein a fluidized solid material is used in the treatment, production, or conversion of hydrocarbons. It is applicable to systems wherein such fluidized solid is continuously recycled between a reaction zone and a separate regeneration or reactivation zone, especially where the atmosphere in the reaction zone is different from that in the regeneration zone and no mixing of the atmospheres in the two zones can be allowed to take place.

Extensive commercial application of such systems has been made in the petroleum industry for the catalytic cracking of hydrocarbons. Equipment of the general type discussed herein is frequently referred to as a "two-vessel system" for handling fluidizing solid. In the general problem of designing such a system, a number of different arrangements of vessels and transfer lines have been proposed. In considering these designs certain basic requirements must always be kept in mind. The first of these is that an adequate driving force must be provided for circulating the solid between the two vessels at the desired rate, with means for varying this driving force over the range required for satisfactory operating control. In addition to this, reliable means must be provided to prevent backflowing of the reactants from either vessel to the other through the transfer lines.

In the design of two-vessel systems of this type for use in the petroleum industry, especially in the catalytic conversion of hydrocarbons using a fluidized solid catalyst, the driving force commonly employed for circulating the catalyst from one vessel to the other has been the fluistatic head generated by a relatively dense column of aerated catalyst in a standpipe. In commercial plant design these standpipes have fed out of each vessel of the two-vessel system at or near the bottom, discharging either through a variable orifice such as a slide valve or into a U-bend at the end of which is a wide open slide valve, provided for positive closure on startup or shutdown. The rate of discharge of catalyst from the bottom of each standpipe is sometimes controlled by an adjustment of the slide valve or by the injection of a portion or all of the media to be reacted in the next stage of the cycle on the upflowing side of the U-bend. Catalyst passing through the slide valves in each standpipe or on the rising side of a U-bend flows into a lower pressure zone where it is picked up by a high velocity stream of a suitable fluidizing medium, which is commonly the reactant for the next stage of the cycle. This catalyst stream is then carried as a relatively low density or dispersed suspension through a transfer line leading up into the other vessel, either above or below a suitable grid supporting fluidized catalyst above.

Regeneration of commercial units in which U-bends are used generally have a large volume beneath this grid, which is not used for regeneration, since the main portion of the air enters the vessel at the bottom beneath the grid and does not see catalyst until it passes through the regenerator grid. Some other units without U-bends also are constructed so that catalyst is introduced into the vessel above the grid so that the volume beneath the grid is not used for regeneration. The present invention provides means for utilizing this otherwise lost volume in one embodiment and for adapting a highly efficient transfer line regeneration zone to a normal reaction/regenerator system in another embodiment.

Summary

The invention makes use of this empty space in the regenerator by providing two stage regeneration by means of two spaced grids, one in the lower part of the regenerator and the other in the upper part. Also, it provides an external catalyst air mixing zone to introduce a reacting stream into this normally empty space. This latter grid receives spent catalyst from the reactor. The lower grid is supplied with catalyst by downflow of spent catalyst from the upper grid and by introduction of spent catalyst from a withdrawal standpipe from the top grid, which catalyst is mixed with regeneration gas and passed to the lower grid through a highly efficient transfer line reaction zone. A large amount of catalyst is held above the grid in the upper zone in order to accomplish a considerable amount of regeneration.

In a second embodiment the second stage regeneration is carried out only in a transfer line between the regenerator and a stripper connected to the reactor. Only one fluid solids regeneration bed is contained in the regeneration vessel. This second embodiment is particularly interesting since it is a novel means by which a two stage regeneration scheme can be applied to an existing unit without major modification to the existing reaction and regeneration vessels.

Description of drawing

Having thus described the basic principles of this invention, its application may be more clearly understood by reference to the attached drawings.

Figure 1:
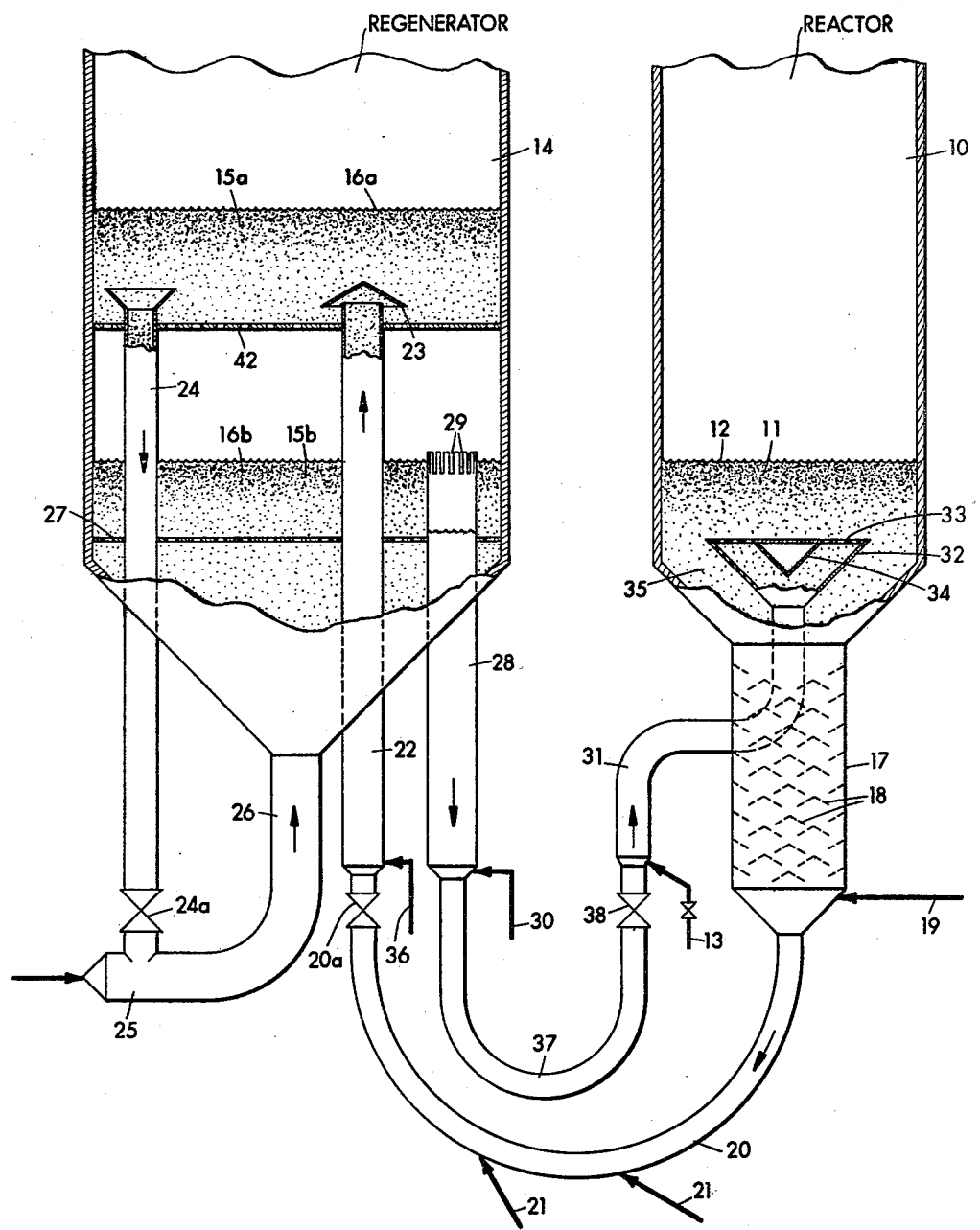

FIGURE 1 is a diagrammatic representation of one form of apparatus adapted for practicing this invention, including a reactor and regenerator suitable for use on the catalytic cracking of hydrocarbons.

Figure 2:
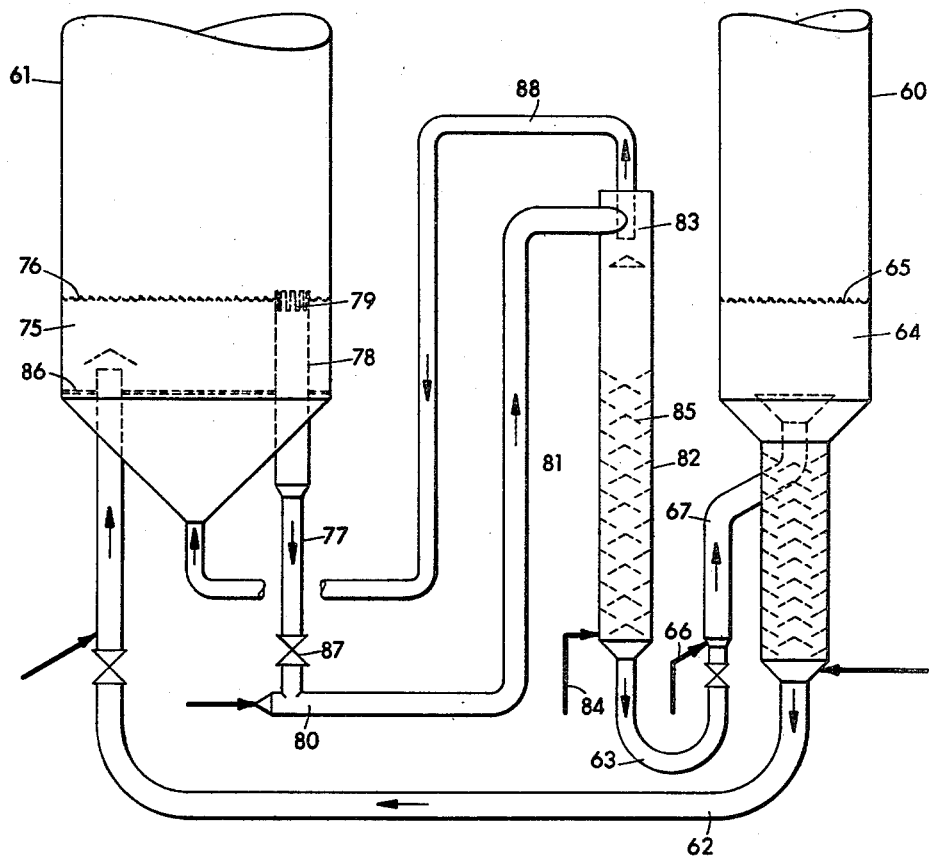

FIGURE 2 is an alternate design embodying the same fundamental principles.

Referring now to FIGURE 1 of the drawings, the system illustrated includes a vertically arranged cylindrical reaction vessel or reactor 10 containing a fluidized bed 11 of catalyst having a level indicated at 12, in which the hydrocarbons introduced at line 13 are undegoing catalytic cracking. Hydrocarbon gases or vapors passing upward through the fluid bed 11 maintain the bed in a dense turbulent fluidized condition having the appearance of a boiling liquid. A separate regeneration vessel or regenerator 14 arranged at approximately the same level as reactor 10 contains a similar fluidized bed 15a of catalyst having a level indicated at 16a, which is undergoing regeneration to burn off carbonaceous deposits formed during the cracking reaction. Bed 15a is supported by grid 42 the design of which is such that there is a sufficient pressure drop across this grid to prevent reflux through the openings therein into the bottom bed 15b as described below. A relatively large amount of catalyst will be held in the upper bed 15a in order to accomplish a major portion of the overall regeneration, say 25–75% of that taking place in the regeneration scheme. If only a small amount of catalyst were provided there would be only heat exchange in the top bed and there would be essentially no carbon burnoff, since the top bed temperature due to heat exchange would be only 10–50° F. higher than the incoming catalyst from the reactor. The temperature would lie too low to accomplish any degree of regeneration. With added holdup carbon will burn off in the top bed. The heat of combustion will raise the temperature of the bed which will in turn accelerate burnoff. Thus, an appreciable amount of regeneration will take place in the top bed. This bed will have 1.5–20 times the catalyst of the lower bed and/or transfer line. Upflow standpipe 22 is shown as projecting within fluid bed 15a to a level above grid 42, which adds the fluistatic pressure difference of the catalyst within this portion of the upflowing standpipe relative to that in fluid bed 15a which opposes the driving force for catalyst circulation, and thus decreases the bottom tangent line elevation required of the two stage vessel. In other cases, however, it may be desirable for standpipe 22 to terminate at the level of grid 42.

The temperature within reactor 10 is normally controlled by controlling the circulation rate of catalyst through the system. In order to accomplish this, the rate at which lift gas is supplied by line 36 to the upflowing standpipe 22 is controlled by a temperature indicator located at a suitable point in bed 11 or the reactor overhead line. In case the reactor temperature thus determined tends to fall below the desired value, this mechanism is arranged so as to increase the lift gas supply to standpipe 22, decreasing the density of the catalyst suspension therein and increasing the rate of catalyst circulation. With a higher rate of catalyst circulation, more hot catalyst per unit time overflows into well 29 from regenerator 14 and is conveyed into reactor 10, increasing the reactor temperature and the severity of cracking for a given oil feed rate so as to give additional coke on catalyst and a higher rate of heat production when this coke is burned from the catalyst in the regenerator 14. Too high a reactor temperature, on the other hand, will act through the same mechanism to cause a decrease in the air supply to standpipe 22, resulting in a decrease in catalyst circulation rate, less heat supply to the reactor, and less coke produced per unit of time. The amount of oil fed through line 13 and the temperature to which this feed stock is preheated before injecting it into the catalyst stream can also be adjusted to control reactor temperature. This oil perheat may vary from about atmospheric temperature to 850° F. or higher, and is ordinarily within the range from about 400° to 700° F. Cracking severity, which determines product distribution and product quality, is a factor of all these variables, including the feed rate, type, and temperature of the oil feed stock, and the circulation rate, activity, temperature of the catalyst stream entering the reactor and the catalyst holdup in the reactor.

A second fluidized bed 15b having a level 16b is provided in the lower part of regenerator 14 to substantially complete the removal of carbon from the catalyst to a level below 0.2% and possibly as low as 0.1%.

The catalyst employed for this process may be a silica base catalyst prepared by the acid activation fo bentonitic clays or a synthetic catalyst derived from silica gel or other forms of silicic acid. The catalyst may be of the silica-alumina or silica-magnesia type, with suitable additions of other active constituents such as zirconia, boria or the like. This catalyst may be in the form of a finely divided powder prepared by grinding or in the form of small spheres prepared by suitable drying procedures in the case of the synthetic catalysts. The catalyst contains preferably particles having a range of particle sizes, including particles within the size range from 0 to about 200 microns in diameter. The top pressure within the reactor may be about 6 to 10 lbs./sq. in. as determined by the back-pressure of the product recovery system, that is the pressure drop which the product vapors must overcome. The product recovery system, which may be of any suitable type, is not part of the present invention and is not shown in the drawing. The pressure in the top of the regenerator may be about 6 to 15 lbs. Both reactor pressure and the regenerator pressure may be increased considerably beyond the values shown here, by maintaining the proper relationship between them and may be 100 lbs./sq. in. or higher.

The feed stock for the catalytic cracking process may be a gas oil, naphtha, heavy distillate, topped crude, whole crude, or other fractions of crude oil separately or in combination, or the process may be applied to liquid hydrocarbons or hydrocarbon blends derived in part from sources other than petroleum.

The temperature of the cracking reaction may be within the range of between 700 to 1100° F., preferably 900 to 975° F. and the temperature of the regeneration may be between about 900 to 1350° F., preferably about 1100 to 1175° F. The temperature of bed 15a can be lower, about equal to, or hotter than bed 15b and the gas entering this bed through grid 42 from bed 15b has a relatively high amount of oxygen, i.e. 8–17%. Burning also takes place in transfer line 25 as this is a highly efficient contacting zone. The system is adapted to be run under heat balance conditions, that is, substantially all of the heat liberated during regeneration is transmitted to the oil and utilized for vaporization and cracking thereof. The catalyst-oil ratio required to maintain this heat balance operation will vary with the characteristics of the feed stock, the temperature to which this feed stock is preheated by indirect heat exchange with various effluent streams from the cracking and regeneration processes and the cracking temperature desired. This catalyst-oil ratio may vary from about 4 to 1 to 30 to 1 parts by weight, and may be about 10 to 1 under preferred conditions.

Spent catalyst is withdrawn from reactor 10 and flows downward through a stripper 17 which may be provided with baffles 18. A line 19 supplies stripping steam or other stripping gas into the bottom of the stripper. Catalyst withdrawn from the bottom of stripper 17 passes through U-bend seal section 20 and accompanying valve 20a into the connecting vertical riser 22. Riser 22 extends into the lower portion of the regenerator 14 and terminates within the upper portion of the fluid bed 15a therein below the level 16a of this bed. Aeration pipes 21 are provided in this U-bend seal section 20 which connects stripper 17 to upflow standpipe 22, to supply the minimum amount of steam or other aeration gas required to maintain fluidity in the seal section with maximum catalyst density. A deflector cone 23 may be provided in bed 15a a short distance above the top of riser 22 to give improved distribution of the catalyst entering bed 15a.

The catalyst level 16a within the regenerator is fixed by the open upper end of a downflow withdrawal standpipe 24, which extends up into regenerator 14.

Catalyst from fluid bed 15a flows downwardly through standpipe 24 through control valve 24a that takes sufficient pressure drop to prevent air from bypassing bed 15b, and mixes with air introduced through line 25 which transports the catalyst through a highly efficient contacting zone, riser 26, into the bottom of regenerator 14 through a low pressure drop grid 27. Commercial experience has shown that the contacting efficiency in a transfer line regenerator is 10 times that of a bed. Thus, considerable regeneration will take place in this line going into the bottom of the regenerator. Catalyst in regeneration zone 15b overflows into standpipe 28. Vertical slots 29 may be provided at the top of the standpipe 28 to give a smoother rate of catalyst withdrawal and to permit slight variation in catalyst level 16b without large fluctuations in the rate at which catalyst overflows into the withdrawal well. The pressure drop through the two grid systems 22 and 42 is the same as the pressure drop in the conventional single grid system since the catalyst holdup will be the same.

Catalyst flowing downward through standpipe 28 and passing through U-bend seal section 37 and accompanying valve 38 is maintained at maximum fluid density, with the aid of steam or other gas introduced through pipes 30. The seal section 37 comprises that portion of the conduit connecting regenerator 14 with reactor 10 which lies below the horizontal plane where the oil injection line 13 enters the conduit 31. Catalyst flowing downward through standpipe 28 and seal section 37 then passes into reactor 10 by way of transfer line 31 which has a somewhat larger diameter than line 37, and joins line 37 at the level of oil injection line 13 above the U-bend which forms the seal section.

The gas oil or other hydrocarbon feed stock for the cracking process, which may be preheated by indirect heat exchange with various product streams or the regeneration vent gas in any suitable manner, is injected into line 31 through line 13 at a point just above the level where line 31 joins the U-bend seal leg 37. The oil and catalyst mixture formed by the injection or preheated liquid hydrocarbon through line 13 proceeds as a dilute dispersed suspension of cracking catalyst in oil vapors through line 31 into reactor 10. The very large increase in gas volume caused by the vaporization and expansion of the oil in this line by contact with the hot catalyst gives the resulting suspension a high velocity and low density. The velocity of the catalyst-oil suspension decreases upon entry into reactor 10. Thus, the density in the transfer line 31 may have a value within the limit of 2 to 10 lbs./cu. ft. whereas the catalyst density within bed 11 and stripper 17 may be about 20 to 35 lbs./cu. ft. and the density in standpipe 24 and seal sections 20 and 37 may be about 35 to 45 lbs./cu. ft.

Transfer line 31 passes through the side wall of reactor 10 near the top of stripping section 17, and terminates within the reactor in an inverted distributing cone 32. The dilute suspension of catalyst in oil in line 31 is introduced into the bottom of fluid bed 11 through perforated grid 33 arranged horizontally at the top of distributing cone 32. An inverted deflector cone 34 may be provided within distributing cone 32 and below grid 33 to give an improved distribution of catalyst and hydrocarbon vapors across the bottom cross-sectional area of fluid bed 11. The upper end of distributing cone 32 has a diameter smaller than the internal diameter of reactor 10 to form an annular space 35 through which catalyst can flow downward from reactor 10 into the upper part of the stripper 17. Alternatively the tops of standpipes 24 and 28 can terminate at the level of their respective grids, so that the levels 16a and 16b of the beds 15a and 15b will be controlled by slide valves installed in the bottom of standpipes 24 and 28. Thus, the bed levels can be varied thus changing the bed temperatures and permitting on-stream optimization of regeneration conditions.

FIGURE 2 shows a different embodiment of this invention employing the same principles of two-stage regeneration.

The equipment illustrated in this drawing includes a reactor 60 and regenerator 61 connected by transfer lines, including U-shaped seal sections 62 and 63 located at a level below the bottom of the reactor and regenerator. Reactor 60 contains a fluid bed 64 of catalyst having a level indicated at 65. Hydrocarbon feed stock for the catalytic cracking process is injected through line 66 into transfer line 67 leading into the side of the reactor.

Catalyst from the regenerator fluid bed 75 overflows into the upper portion 78 of standpipe 77, which has a larger diameter than the lower portion thereof to serve as a withdrawal well and provide surge capacity to accommodate small fluctuations in the rate at which the catalyst overflows. The total amount of the catalyst holdup in the fluid bed 75 is thus substantially constant, subject to minor changes in the density or particle size distribution characteristics of the catalyst. Vertical slots 79 may be provided at the top of withdrawal well 78 to give a smoother rate of catalyst withdrawal, and to permit slight variations in catalyst level 76 without large fluctuations in the rate at which catalyst overflows into the withdrawal well.

Hot catalyst flowing downward through standpipe 77 flows downward through valve 87 which prevents upflow of air into standpipe 77 and is mixed with compressed air introduced into line 80. The hot catalyst raises the air temperature to the neighborhood of 1100° F. to 1200° F., where further carbon burnoff is accomplished, reducing the carbon level on the catalyst to low limits. The air-catalyst mixture is transported up column 81 into the top of stripper 82 where excess air and nitrogen is separated by means of cyclone 83. The separated catalyst falls through stripper 82 countercurrent to stripping gas such as flue gas or stream introduced at the bottom of stripper 82 through line 84. This stripping gas removes the partially used regeneration air from the catalyst to minimize oxygen carryover to the reactor. A catalyst level 85 is maintained in stripper 82 by the pressure equal to the sum of pressure in regenerator 61, the bed pressure drop in the regenerator, and the pressure drop through the grid 86 in the regenerator 61 and the gas pressure drop through the gas line 88 from the outlet of the cyclone 83 to the regeneration vessel and the cyclone 83 pressure drop. This is the pressure that forces the catalyst from the stripper 82 through lines 63 and 67 into the reactor 60.

As a specific example of densities and pressure differentials suitable for operation in a system of this type, a catalytic cracking plant designed according to FIGURE 1 and using a synthetic silica-alumina catalyst in the form of spray-dried microspheres having a size distribution of 2% 0–20 microns, 15% 20–40 microns, 71% 40–80 microns and 12% 80+ microns may have a reactor top pressure of 9.5 lbs/sq. in., a reactor bed density of .28 lbs./cu. ft. for a normal bed depth of 10 ft., a catalyst density of 32 lbs./cu. ft. for a 26 ft. depth through stripper section 17, a pressure of about 19.5 lbs./sq. in. at the level of stripping gas inlet 19, and a density of 38 lbs./cu. ft. in seal section 20, as well as in seal leg 37 and downflow standpipes 24 and 28; under these conditions the regenerator top pressure may be about 9.8 lbs./sq. in., with a catalyst density of 20 lbs./cu. ft. for a 10 ft. depth in fluid bed 15a and a density of 20 lbs./cu. ft. for a 6 ft. depth in fluid bed 15b giving a 11.2 lbs./sq. in. pressure at the level of grid 42 and a 13.5 lbs./sq. in. pressure at the level of grid 27 and a 17.5 lbs./sq. in. pressure at the level of air injection line 36 when the density of the suspension upflow standpipe 22 is about 25 lbs./cu. ft. and the density of the dilute suspension in transfer line 31 is about 3 lbs./sq. in., the pressure drop across fluid bed 15a in the regenerator is about 1.4 lbs./sq. in. The height of the seal legs below oil injection line 13 and air injection line 36 above the bottom of U-bends 37 and 20, respectively, is about 5 ft., which is enough to build up a fluistatic sealing pressure of about 1.3 lbs./sq. in. in each.

By virtue of the U-bend seal sections described, both of these designs are suited for use in catalytic cracking plants operating at superficial gas velocities considerably higher than those used in present commercial practice. The specific data shown in the above example are suitable for operation in the preferred velocity range of about 2.5 to 3.0 ft./sec. in both the reactor and regenerator. This process will operate equally as well at lower velocities as low as the minimum aeration velocity of the catalyst, which may be within the range from about 0.1 to 0.5 ft./sec., and higher velocities may be employed up to about 6 to 8 ft./sec., which is considerably above the free falling velocity of the catalyst particles employed.

While this process has been described in terms of a specific silica-alumina catalyst, other cracking catalyst may be equally suitable. In general, the figures given here relate to operation with ordinary cracking catalysts.

With catalysts or solids having much higher or lower density, the densities and velocities given will vary but the same principles of fluistatic pressure control will apply. The temperatures, feed rates and severity of cracking employed do not form any part of my invention and are not limiting thereon.

While the above discussion has described, by way of example, the specific application of this invention to systems for the catalytic cracking of hydrocarbons, it will be appreciated that the same basic principles may be employed to advantage in a variety of other applications. Thus, the invention is adapted for the hydroforming of naphthas, and other important uses may be found in the field of the catalytic conversion of gases or vaporized materials wherever it is necessary to regenerate a finely divided solid catalyst at frequent intervals by oxidation, reduction, sulfurization or other special treatment after it becomes spent during the conversion period. An example of the many non-catalytic processes in which such a system may be used is in the thermal cracking of heavy carbonaceous materials such as reduced crude using a recycle stream of inert solid as a heat carrier. Another example is in the treatment of a stream of mixed gaseous or liquid hydrocarbons with silica gel, activated charcoal, or other suitable solid adsorbents for the removal and recovery of a desired constituent from such a mixture by selective adsorption. Another example is the distillation of oil from oil shale, where the spent shale may be roasted in a stream of oxidizing gas in a separate vessel and recycled to the distilling vessel to provide heat for the distillation of more oil from the fresh shale introduced. Other uses may involve the carbonization of coal, the roasting of ores, the reduction of metal oxides, or the transfer of heat between fluid streams by means of solids.

From the above description still other modifications and applications of this invention will be apparent to those skilled in the art of handling fluidized solids.

When operating according to FIGURE 2, the following balance exists.

|  | Conventional unit | Two-stage unit of present invention (Fig. 2) |
|---|---|---|
| Regenerator Pressure, p.s.i.g. | 12.0 | 9.5 |
| Regenerator Velocity,[1] foot/sec. | 2.3 | 2.5 |
| Catalyst bed 75 pressure,[2] p.s.i. | 3.0 | 3.0 |
| Grid 85 pressure, p.s.i. | 1.5 | 1.5 |
| Cone 78 pressure drop, p.s.i. | 0.0 | 0.0-0.1 |
| Inlet line 80 pressure drop, p.s.i. | 1.0 | 1.0 |
| Stripper vessel separator 82 pressure drop, p.s.i. |  | 1.0 |
| Transfer line 81 pressure drop,[3] p.s.i. |  | 2.5 |
| Inlet air 80 pressure, p.s.i.g. | 17.5 | 17.5 |
| Pressure forcing catalyst to reactor side, p.s.i.g. | 12.0 | 14.5 |

[1] Taking no carbon yield credit for reduced carbon on cat. and no increased blower air pressure that would be available as a consequence of the lower air rate due to the lower carbon yield from the more efficient cracking reactor.
[2] 17 foot deep bed at 25 pounds per cubic foot density.
[3] 70 foot transfer line at 5 pounds per cubic foot density (actual will be about 1-2 #/CF).

Thus, it can be seen that 2.5 p.s.i. more pressure drop is available in the process of this invention to force catalyst into the reactor and also 2.5 p.s.i. more pressure drop is available to increase circulation in the spent catalyst circuit.

The nature of the present invention having thus been fully set forth and examples of the same given, what is claimed as new, useful and unobvious and desired to be secured by Letters Patent is:

1. The process of regenerating catalyst in a two vessel fluidized solids reaction system including a fluidized catalytic reaction vessel and a fluidized catalyst regeneration vessel comprising the steps of:
   (a) withdrawing catalyst which requires regeneration from said reaction vessel;
   (b) passing said catalyst to a first fluidized bed regeneration zone in said regeneration vessel;
   (c) partially regenerating said catalyst in said zone in the presence of partially spent regeneration gas;
   (d) passing partially regenerated catalyst from said first regeneration zone to a second stage regeneration zone comprising a transfer line regeneration zone;
   (e) further regenerating said partially regenerated catalyst in said transfer line regeneration zone in the presence of fresh regeneration gas; and
   (f) passing regenerated catalyst to said reaction vessel.

2. Process according to claim 1 in which said transfer line regeneration zone is in direct communication with a second fluidized bed regeneration zone located below the first fluidized bed regeneration zone in said regeneration vessel and catalyst from step (e) is passed to said second fluidized bed regeneration zone for further regeneration.

3. The process of claim 1 in which the substantially completely regenerated catalyst is stripped of high oxygen containing gases in a separate stripper zone with steam or flue gas.

4. Process in claim 1 wherein all the regeneration air is first introduced in the second zone into the partially regenerated catalyst from the first regeneration zone and all the partially spent gases are separated and passed into the first zone to accomplish the regeneration of the first zone.

References Cited

UNITED STATES PATENTS

| 2,414,002 | 11/1947 | Thomas et al. | 208—164 |
| 2,788,311 | 4/1951 | Howard et al. | 208—164 |
| 2,959,537 | 11/1960 | Welty | 208—164 |
| 3,161,583 | 12/1964 | Pohlenz | 208—164 |
| 3,213,014 | 10/1965 | Atkinson et al. | 208—164 |
| 3,294,675 | 12/1966 | Adams et al. | 208—164 |

HERBERT LEVINE, Primary Examiner

U.S. Cl. X.R.

23—288; 208—155